Oct. 12, 1948.  F. S. WEINIG  2,450,926
PARACHUTE MADE OF SELF-SUPPORTING RIBBONS WHICH
ARE COMPOSED OF BROAD AND NARROW BANDS
Filed Aug. 18, 1947  2 Sheets-Sheet 1

INVENTOR.
F. S. WEINIG
BY Wade Kovitz AND
Charles H. Wagner
ATTORNEYS

Oct. 12, 1948.  F. S. WEINIG  2,450,926
PARACHUTE MADE OF SELF-SUPPORTING RIBBONS WHICH
ARE COMPOSED OF BROAD AND NARROW BANDS
Filed Aug. 18, 1947  2 Sheets-Sheet 2

INVENTOR.
F. S. WEINIG
BY Wade Koontz AND
Charles H. Wagner
ATTORNEYS

Patented Oct. 12, 1948

2,450,926

UNITED STATES PATENT OFFICE 2,450,926

PARACHUTE MADE OF SELF-SUPPORTING RIBBONS WHICH ARE COMPOSED OF BROAD AND NARROW BANDS

Friedrich Stefan Weinig, Stuttgart-Moehringen, Germany

Application August 18, 1947, Serial No. 769,284

9 Claims. (Cl. 244—145)

(Granted under the act of March 3, 1883, as amended April 30, 1928; 370 O. G. 757)

The invention described herein may be manufactured and used by or for the Government for governmental purposes without payment to me of any royalty thereon.

This invention relates to parachutes, and more particularly to improvements in ribbon parachutes of the load-sustaining ribbon type, in which the parachute canopy is of preformed hemispherical or substantially hemispherical in shape, usually having a central or apex vent and composed of load-sustaining ribbons extending across the top of the canopy in pairs at opposite sides of the vent at equally spaced distances at opposite sides of the top center of the canopy, with opposite ends of the pairs of ribbons converging downwardly and secured at the base or skirt of the canopy at substantially opposite sides at equally spaced points located around the lower edge of the canopy, the arrangement providing a reticuled parachute canopy of load-sustaining ribbons forming rhombic-shaped interstices or openings between the ribbons throughout the canopy area, load suspension lines or shock cords to which the load to be lowered is attached being secured to the opposite ends of the pairs of ribbons preferably in groups, which are in turn connected to stronger load suspension lines, connected at their lower ends to the parachute harness or other load carrying means. The canopies are of preformed hemispherical shape with the ribbons extending across the top and preferably retained in place relative to each other by a plurality of annular securing ribbons or bands extending around the canopy in spaced relation to each other and parallel to the base or lower edge of the canopy, the securing ribbons preferably crossing the load-sustaining ribbons at the points of crossing of the load-sustaining ribbons and secured to the sustaining ribbons at these points of crossing by stitching or other suitable securing means. An annular reinforcing band is preferably provided, extending around the base or lower edge of the canopy and another reinforcing band around the edge of the apex vent.

This type of parachute canopy is especially satisfactory when used at high speeds, in excess of three hundred miles an hour, being very strong, light, inexpensive to manufacture, requiring a minimum amount of material and being relatively easy and convenient to assemble, pack and wear. When used they materially reduce the opening shock on the occupant or load, and on the parachute structure itself, providing increased initial permeability and minimum oscillation, especially where the initial velocities are high, quickly reducing the rate of descent comparable to that of a conventional fabric chute so as to safely lower an occupant without "blacking out", with a minimum tendency of damage or rupture to the chute structure. The ribbons initially flex between their secured portions to provide an increased permeability at high speed and uniform deceleration, permitting the ribbons to return to their normal flat form, reducing the size of the rhombic-shaped openings to cause a correspondingly increased turbulence in the air passing through the openings and a further decrease in the permeability of the canopy and a corresponding decrease in the descent velocity.

In the ribbon parachutes above noted load-sustaining ribbons are employed which are of uniform width from end to end, producing an excessive accumulation of overlapping ribbon material in the upper portion of the canopy and area surrounding the apex vent, causing a relatively low degree of permeability in this upper portion of the canopy which decreases to substantially no permeability at the top area adjacent the vent opening.

An object of the present invention is to reduce or eliminate the aforesaid excessive accumulation of material throughout the top portion of the canopy and correspondingly increase the degree of permeability in the top portion of the canopy.

A further object is the provision of an improved parachute construction employing obliquely crossing load-sustaining ribbons in which the relative degree of permeability throughout the entire area of the canopy is more nearly equalized.

A further object is to provide a parachute construction in which the relative width of the ribbons in the top portion of the canopy is reduced to eliminate the excessive overlapping of material and provide more uniform air permeability through the canopy area, especially at the apex portion, reducing the high tension stresses on the ribbons during the opening of the chute, and reducing the weight and bulk of the parachute structure when packed.

A still further object is the provision of a ribbon parachute canopy composed of similar pairs of ribbons of unequal width throughout a greater portion of their length in which the ribbons extend across the canopy at opposite sides of the vent opening, with the ends of the ribbons secured together in pairs at points on the opposite sides of the canopy equally spaced around the skirt of the canopy, in which one ribbon of each pair is of uniform width from one of said securing points to a point near the apex vent and reduced in width from the said last point throughout the rest of its length, across the top and down the opposite side of the canopy, with its opposite or reduced end secured to the base at a point substantially opposite from its other secured end.

A further object is the improvement in ribbon parachutes of the hemispherical performed type having load-sustaining ribbons extending across the canopy from side to side from substantially opposite points around the skirt of the canopy, in which the ribbons are reduced in width throughout a greater portion of their length to reduce the overlapping area of the ribbons throughout the upper portion of the canopy and provide a more uniform reticulated area of rhombic-shaped openings throughout the canopy surface.

Other objects and advantages will become apparent from the following description taken in conjunction with the accompanying drawings, in which like reference characters refer to like parts parts in said figures.

Figure 1:
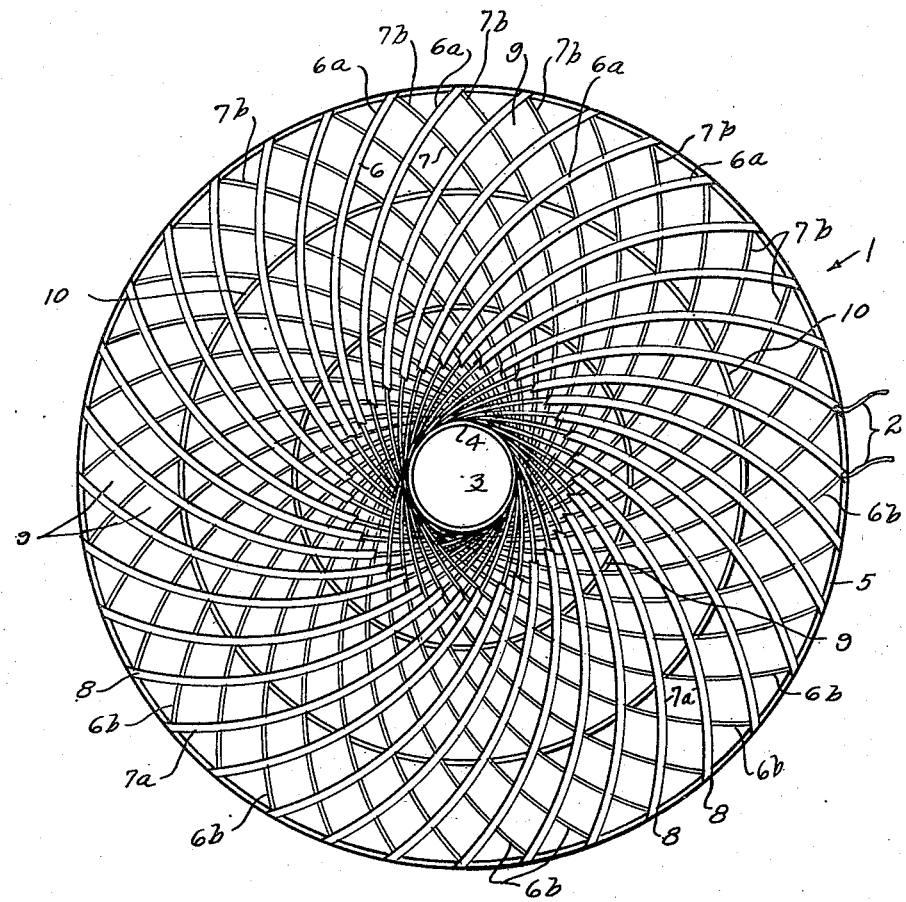
Fig. 1 is a somewhat diagramatic plan view of a parachute canopy constructed in accordance with my invention.
Figure 2:
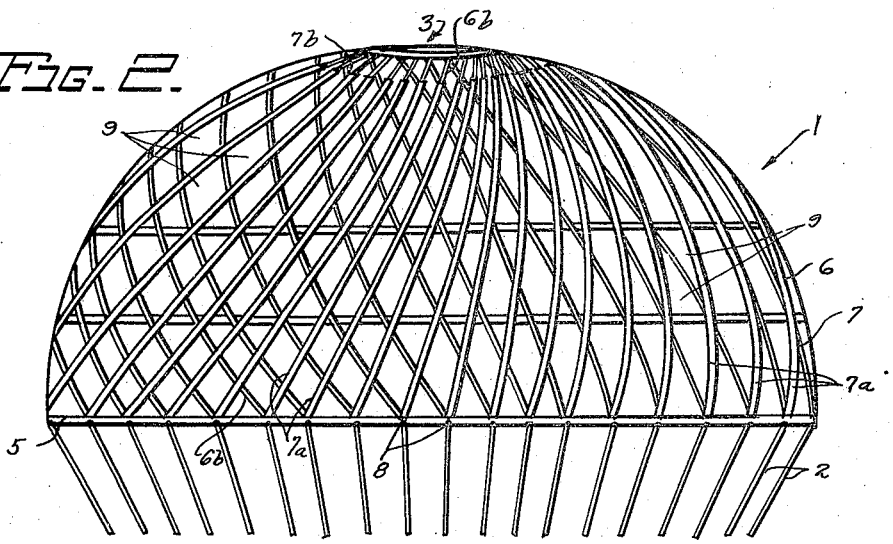
Fig. 2 is a side elevation of the canopy shown in Fig. 1.

Referring more particularly to Figs. 1 and 2 of the drawings, the reference numeral 1 indicates generally the canopy of a ribbon parachute constructed in accordance with the disclosure of my invention. Load suspension lines or shock cords are indicated at 2 which are attached to the load-supporting harness or other load attaching means, not shown, the lower end portion of the load suspension lines or cords 2 being broken away because these ends and the harness, or other attached means, are conventional and not important to the novelty of this invention. Any type of load suspension rings or harness may be secured to the lower ends of the load suspension lines 2. The canopy 1 is preferably hemispherical in shape, having a conventional air or apex vent 3 in the top, which vent may be reinforced around its periphery by an annular band of webbing as shown at 4 in Figs. 1 and 3, although the edge of the vent opening is ordinarily reinforced to a sufficient extent by the overlapping secured portions of the load-sustaining ribbons 6 and 7 which are stitched together around the vent opening, later to be described. The base or skirt portion of the canopy, at the lower edge, is also reinforced by a strong flexible band 5 of webbing as best seen in Fig. 2. This band 5 extends completely around the lower canopy edge to prohibit the expansion of the canopy beyond a maximum predetermined degree during the initial opening and descent of the parachute.

At points equally spaced along the annular webbing 5, around the lower canopy edge, preferably at substantially opposite sides of the canopy, the opposite ends of a plurality of pairs of load sustaining ribbons 6 and 7 are secured, one of the ends of each pair being secured together with the other ends of the pair secured to the ends of ribbons of other pairs. The ribbons of each pair are identical and all of the pairs form the canopy proper, extending across the canopy from side to side as shown in Fig. 1, crossing the top at diametrically opposite sides of the vent opening 3, each pair being connected together at their opposite extremities to the annular webbing 5 at points 8, by stitching or suitable fastening means.

The ribbons 6 of each pair extend obliquely upward across the top of the canopy crossing the ribbons 7 of other pairs which also extend obliquely upward across the top but in the opposite direction, a multitude of rhombic shaped openings 9 being formed throughout the area of the canopy between the grids which are formed by the crossing of the ribbons 6 and 7.

Figure 3:
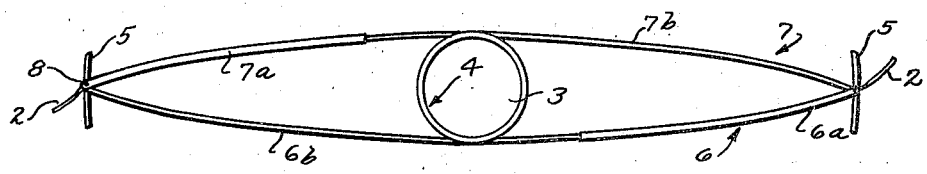
Fig. 3 is a somewhat diagramatic fragmentary view disclosing a pair of the load-sustaning ribbons employed in the construction shown in Figs. 1 and 2.

The ribbons 6 and 7 as shown in Figs. 1 and 3 are fairly broad, about two inches wide, for a minor portion of their length and then reduced in width throughout the balance of their length, the ribbons being narrow at one end and wide at the other end, the narrower section extending from one end to a point intermediate the opposite end of the ribbon and its middle portion. It should be noted that the central portion of the load-sustaining ribbons intermediate the ends is, in all cases, at least narrower than one end of the ribbon. The wider portions of the ribbons 6 and 7 are indicated by the reference numerals 6a and 7a, respectively, and the major narrow portions are respectively indicated at 6b and 7b, reasons for the different width of these ribbons being subsequently pointed out.

The ribbons are initially woven, constructed and arranged to naturally cling closely to the substantially hemispherical shape of the canopy so as to naturally lay with their entire width from end to end in the curved surface of the canopy. The ribbons may be arranged on geodetic lines, in which case their center lines lie on "great circles" extending across the hemispherical surface of the canopy in oblique overlapping relation to each other, being secured to the lower edge of the canopy at points 8 as before set forth, the radius of the "great circles" being equal to the radius of curvature of the canopy or as shown in Fig. 1 of the drawings the ribbons are connected in pairs at one end only and the opposite ends of each of the pairs are connected to the ends of other pairs of ribbons.

It may be desirable to provide fastening bands or supplemental annular retaining ribbons as indicated at 10, in Figs. 1 and 2, each of these annular ribbons extending around the canopy parallel to each other and to the lower edge. The pairs of load-sustaining ribbons 6 and 7 are preferably stitched or otherwise secured to these circular bands 10 at their points of crossing and constitute means for assisting in retaining the load suspension ribbons 6 and 7 in their relative oblique cross relations, preventing the shifting of the ribbons 6 and 7 during packing, initial opening and descent of the parachute, also resisting some of the expansive stresses on the inflated canopy between the base band 5 and the apex vent opening 3.

The load suspension ribbons 6 and 7 are identical and are all connected at their wide portions 6a and 7a to the base of the skirt portion of the canopy and extend across the top in equally spaced relation to the top center at one side thereof, terminating at the opposite side of the base portion of the canopy. Since the ribbons all cross the top of the canopy in equally spaced relation from the top center, or at the edge of the apex vent, the longitudinal center lines of the adjacent ribbons converge as they approach the top portion. In ribbon parachutes utilizing sustaining ribbons of uniform width and obliquely crossing each other throughout the canopy area, the rhombic-shaped openings are progressively decreased in size from the base of the canopy to the top portion. As the top portion is reached the ribbons overlap each other to such an extent that this area is reduced to zero air permeability; also the overlapping material is bulky and unnecessary, making the chute heavier, more expensive to manufacture because of the excessive material, more difficult to pack, and due to its extra bulk, less convenient to wear. In my improved parachute the reduction in width of the load-sustaining ribbons 6 and 7, as indicated at 6b and 7b, not only provides a desired degree of uniform permeability and distribution of the rhombic-shaped openings 9 over a greater portion of the top of the canopy, but also eliminates a considerable amount of excess material that was formerly employed in the canopy structure without sacrificing strength, efficiency or any safety factors of the parachute, thereby saving considerable material, weight and time of manufacture. Since the overlapping portions are greatly reduced in area in my improved canopy, the chute will be lighter and easier to pack and wear, and provide greater initial permeability at high velocities.

Figure 4:
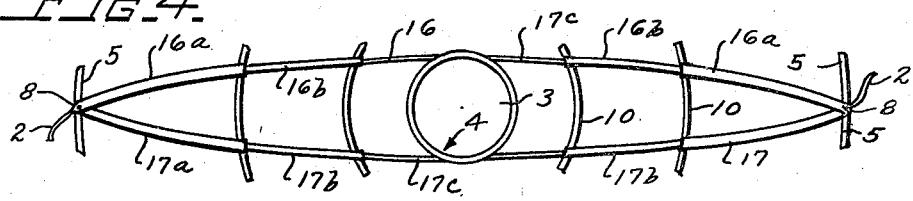
Fig. 4 is a view similar to Fig. 3 disclosing a slight modification in the ribbon construction.

While I have disclosed in Figs. 1 to 3 a plurality of load-sustaining ribbons 6 and 7 which are reduced in width throughout the middle portions, where they cross the top of the canopy and overlap each other at the periphery of the vent opening 3, it may be desirable to employ ribbons which are graduated in width in the manner disclosed diagrammatically in Fig. 4. In this figure only one pair of ribbons is illustrated, it being understood that a multitude of pairs is to be used and may be laid across the canopy in the same manner as disclosed in Fig. 1. The ribbons in this figure are all identical and indicated at 16 and 17. If taken individually in the completed canopy, they all extend obliquely upward from the skirt of the canopy in the same direction from substantially equally spaced points located around the canopy, extending across the top of the canopy at one side of the apex vent 3 and obliquely down to the skirt portion, terminating at the lower edge at points on the opposite side of the canopy from the starting points of the ribbons.

Since at least one end of any two ribbons 16 and 17 of a pair are secured together at a common point at one side of the canopy, these ribbons may be considered as pairs of ribbons crossing the top of the canopy at equal distances from the top center. The wider portions of the ribbons indicated at 16a and 17a incline upwardly when in place in the canopy, to a point where the rhombic-shaped openings are so reduced in size that the edges of the ribbons overlap each other. At these intermediate points in the length of the ribbons 16 and 17 the widths are reduced as indicated at 16b and 17b. This intermediate width continues to the points where the edges of the ribbons again overlap each other at the opposite sides of the middle portions of the ribbons and between the intermediate width portions 16b and 17b. Here the ribbons are again reduced in width as at 16c and 17c, this reduction in width extending throughout the upper portion of the canopy and where the ribbons overlap each other around the periphery of the apex vent 3.

In the use of the improved parachute it is packed in the conventional manner, a pilot chute being employed with suitable release means if desired to withdraw the ribbon chute from the conventional "pack" upon release. When a parachute incorporating the invention is released, particularly at high velocities, the chute opens quickly and positively but does not initially expand beyond its normal preformed substantially hemispherical diameter, or present a greater initial parachute area to the relatively high velocity air passing the chute at the time of release. Once the chute opens, while traveling at high velocity, air pressure on the interior of the canopy initially flexes the supporting ribbons 6 and 7 between their intersecting and secured portions, permitting the air to pass somewhat freely through the enlarged rhombic-shaped openings but with sufficient resistance and turbulence to cause uniform deceleration without excessive shock or oscillation being communicated to the load or occupant. As the chute decelerates the ribbons quickly return to their normal flat form, conforming naturally throughout their length and width to the contour of the canopy, causing a reduction in size of the rhombic-shaped openings, further retarding air flow through the openings with a maximum increase in air turbulence, further reducing the rate of descent to approximately that of a conventional chute and the occupant or load supported will be safely and gently lowered without either excessive oscillation or shock, the ribbons of varying width throughout their length as at 6a, 6b and 7a and 7b, or 16a, 16b, 17c and 17a, 17b and 17c affording means for regulating the size of the rhombic-shaped openings in the initial fabrication of the canopy so that the opening will be more nearly uniform throughout the entire canopy area.

It is not desired to limit the invention to the exact arrangement and details herein shown and described, as it will be apparent that minor changes in details of construction, proportion and arrangement of parts may be made without departing from the spirit of the invention as defined in the following claims.

I claim:

1. A parachute canopy having an apex vent, composed of load-sustaining ribbons of unequal width throughout their length extending across the top of the canopy in pairs at opposite sides of the vent from points at opposite sides of the canopy equally spaced around the skirt of the canopy to provide a canopy of load-sustaining ribbons crossing each other obliquely to form rhombic-shaped openings throughout the canopy area.

2. A parachute canopy having an apex vent, composed of load-sustaining ribbons of unequal width throughout their length extending across the top of the canopy in pairs at opposite sides of the apex vent from points at opposite sides of the canopy equally spaced around the skirt of the canopy to provide a canopy of ribbons crossing each other obliquely to form rhombic-shaped openings throughout the canopy area, in which each of the individual ribbons is composed of at least two bands of different widths.

3. In a parachute canopy of the class described, having an apex air vent and a skirt portion and composed of a plurality of load-sustaining ribbons extending obliquely upward away from each other in pairs from common points on the skirt portion, across the apex air vent at opposite sides thereof and converging downwardly to common points at opposite sides of the skirt portion, each ribbon having a wide portion extending upwardly from the skirt portion to a point intermediate the skirt portion and the apex air vent and a narrow portion extending from the wide portion across the top of the canopy, to reduce the overlapping area of the sustaining ribbons in the apex portion of the canopy.

4. In a ribbon parachute, a canopy having a skirt portion and an apex portion, a plurality of load-sustaining ribbons of unequal width throughout their length connected at their opposite ends to equally spaced points located around the skirt portion of the canopy and crossing the apex portion at equally spaced distances at one side of the center of the apex portion, said ribbons each being of relatively narrower width throughout the apex portion of the canopy.

5. In a ribbon parachute, a canopy having a skirt portion and an apex portion, a plurality of load-sustaining ribbons of unequal width throughout their length connected at their opposite ends to equally spaced points located around the skirt portion and crossing the apex portion at equally spaced distances at one side of the center of the apex portion, said ribbons each being relatively narrower in width at one end and through a major portion of their length.

6. In a ribbon parachute, a canopy of hemispherical shape having a skirt portion and an apex portion with a central vent therein and composed of a plurality of overlapping load-sustaining ribbons arranged in pairs extending across the top of the canopy at equally spaced distances at opposite sides of the top center of the canopy, the respective ends of the pairs of load-sustaining ribbons being secured at opposite sides of the canopy at points equally spaced around the skirt portion, each pair of said load-sustaining ribbons being of relatively narrow width from one end and throughout a major portion of their length and of relatively greater width throughout the balance of their length to reduce the relative width of the ribbons in the apex portion of the canopy, and load suspension lines connecting the ends of the pairs of load-sustaining ribbons for suspending a load to the opposite ends of the load-sustaining ribbons.

7. In a ribbon parachute of the class described, a parachute canopy composed of a plurality of load-sustaining ribbons extending upwardly in pairs in oppositely inclined directions from points equally spaced around the skirt portion of the canopy and crossing the top portion of the canopy at opposite sides of the top center in equally spaced relation to the top center, said load-sustaining ribbons each being narrower in width from one end thereof to a point intermediate the ends of the ribbon and opposite end, and secured together in pairs at the skirt portion with the narrower portion of one ribbon and the wider portion of the other ribbon of each pair connected to each other, to thereby reduce the width of the ribbons in the top portion of the canopy relative to the width of the ribbons in the skirt portion, and load suspension lines attached to the opposite ends of each pair of load-sustaining ribbons.

8. In a ribbon parachute of the class described a canopy composed of a plurality of load-sustaining ribbons arranged in pairs inclining upwardly from the base of the canopy away from each other and extending across the top of the canopy from a plurality of points at opposite sides of the canopy equally spaced around the skirt portion of the canopy, crossing the top of the canopy at opposite sides of the top center to provide a reticulated canopy composed of load sustaining ribbons crossing each other obliquely to leave a multitude of rhombic-shaped openings throughout the area of the canopy, the improvement which comprises utilizing the ribbons having a narrower width throughout the upper portion of the canopy to thereby reduce the overlapping area of the ribbons in the upper portion of the canopy and reduce the bulk of the ribbon material in the overlapping portions of the ribbons in the top portion of the canopy.

9. In a parachute of the class described, a hemispherical canopy having a skirt portion and an apex portion with a central vent therein, load-sustaining ribbons each having a width intermediate its ends which is narrower than at least one end thereof, said load-sustaining ribbons being arranged in pairs throughout the canopy with the ends of each pair secured to the base portion at opposite sides of the canopy at points uniformly spaced around the skirt portion, said load-sustaining ribbons inclining upwardly away from each other across the top of the canopy at opposite sides of the central vent to form a reticulated canopy rhombic-shaped openings in which the narrower portions of the ribbons are disposed in the area of the canopy surrounding the central vent to eliminate the excess overlapping material of the ribbons normally found in this portion of the canopy when load-sustaining ribbons of uniform width throughout their length are employed.

FRIEDRICH STEFAN WEINIG.

REFERENCES CITED

The following references are of record in the file of this patent:

Publication: "Aviation News," issue of June 17, 1946, page 22, picture of Stratospheric 'Chute.